(12) United States Patent
Ishiguro et al.

(10) Patent No.: US 12,294,054 B2
(45) Date of Patent: May 6, 2025

(54) NON-AQUEOUS ELECTROLYTE SECONDARY BATTERY

(71) Applicant: Panasonic Intellectual Property Management Co., Ltd., Osaka (JP)

(72) Inventors: Tasuku Ishiguro, Osaka (JP); Yasuko Nozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 662 days.

(21) Appl. No.: 17/613,650

(22) PCT Filed: May 21, 2020

(86) PCT No.: PCT/JP2020/020067
§ 371 (c)(1),
(2) Date: Nov. 23, 2021

(87) PCT Pub. No.: WO2020/241438
PCT Pub. Date: Dec. 3, 2020

(65) Prior Publication Data
US 2022/0238919 A1 Jul. 28, 2022

(30) Foreign Application Priority Data
May 30, 2019 (JP) ................. 2019-101730

(51) Int. Cl.
*H01M 10/0567* (2010.01)
*H01M 4/505* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ............ H01M 10/0567; H01M 4/505; H01M 10/0568; H01M 4/525; H01M 4/0568
See application file for complete search history.

(56) References Cited

U.S. PATENT DOCUMENTS

2016/0013517 A1   1/2016  Nakazawa et al.
2017/0162906 A1*  6/2017  Nakazawa ............ H01M 4/587
(Continued)

FOREIGN PATENT DOCUMENTS

CN    106129472 A    11/2016
JP    2001-243982 A   9/2001
(Continued)

OTHER PUBLICATIONS

Machine translation WO-2014024990-A1 (Year: 2014).*
(Continued)

*Primary Examiner* — Nicholas A Smith
*Assistant Examiner* — Zackary Richard Cochenour
(74) *Attorney, Agent, or Firm* — WHDA, LLP

(57) ABSTRACT

A non-aqueous electrolyte secondary battery having a positive electrode, a separator, a negative electrode opposed to the positive electrode via the separator, and a liquid electrolyte wherein the liquid electrolyte includes a lithium salt, methyl acetate, and dimethyl sulfone. The content ratio of methyl acetate in the liquid electrolyte is 10% by mass to 40% by mass, and the content ratio of dimethyl sulfone in the liquid electrolyte is 0.1% by mass to 5% by mass.

8 Claims, 1 Drawing Sheet

(51) Int. Cl.
*H01M 4/525* (2010.01)
*H01M 10/0525* (2010.01)
*H01M 10/0568* (2010.01)
*H01M 4/02* (2006.01)

(52) U.S. Cl.
CPC ... *H01M 10/0525* (2013.01); *H01M 10/0568* (2013.01); *H01M 2004/028* (2013.01); *H01M 2300/0025* (2013.01)

(56) References Cited

U.S. PATENT DOCUMENTS

| | | |
|---|---|---|
| 2017/0222268 A1 | 8/2017 | Abe et al. |
| 2018/0159173 A1* | 6/2018 | Chika ............... H01G 11/64 |
| 2019/0103605 A1* | 4/2019 | Saitou ............... H01M 4/366 |
| 2019/0372167 A1* | 12/2019 | Kim ............... H01M 10/0568 |
| 2020/0020987 A1 | 1/2020 | Morisawa et al. |
| 2020/0388829 A1* | 12/2020 | Zhong ............... H01M 4/364 |

FOREIGN PATENT DOCUMENTS

| | | | |
|---|---|---|---|
| JP | 2018-63942 A | 4/2018 | |
| WO | WO-2014024990 A1 * | 2/2014 | ......... H01M 10/052 |
| WO | 2014/157591 A1 | 10/2014 | |
| WO | 2016/009994 A1 | 1/2016 | |
| WO | WO-2017169184 A1 * | 10/2017 | ............ H01M 10/05 |

OTHER PUBLICATIONS

International Search Report dated Aug. 25, 2020, issued in counterpart International Application No. PCT/JP2020/020067 (2 pages).
The Extended European Search Report dated Aug. 5, 2022 for the related European Patent Application No. 20815403.9.

* cited by examiner

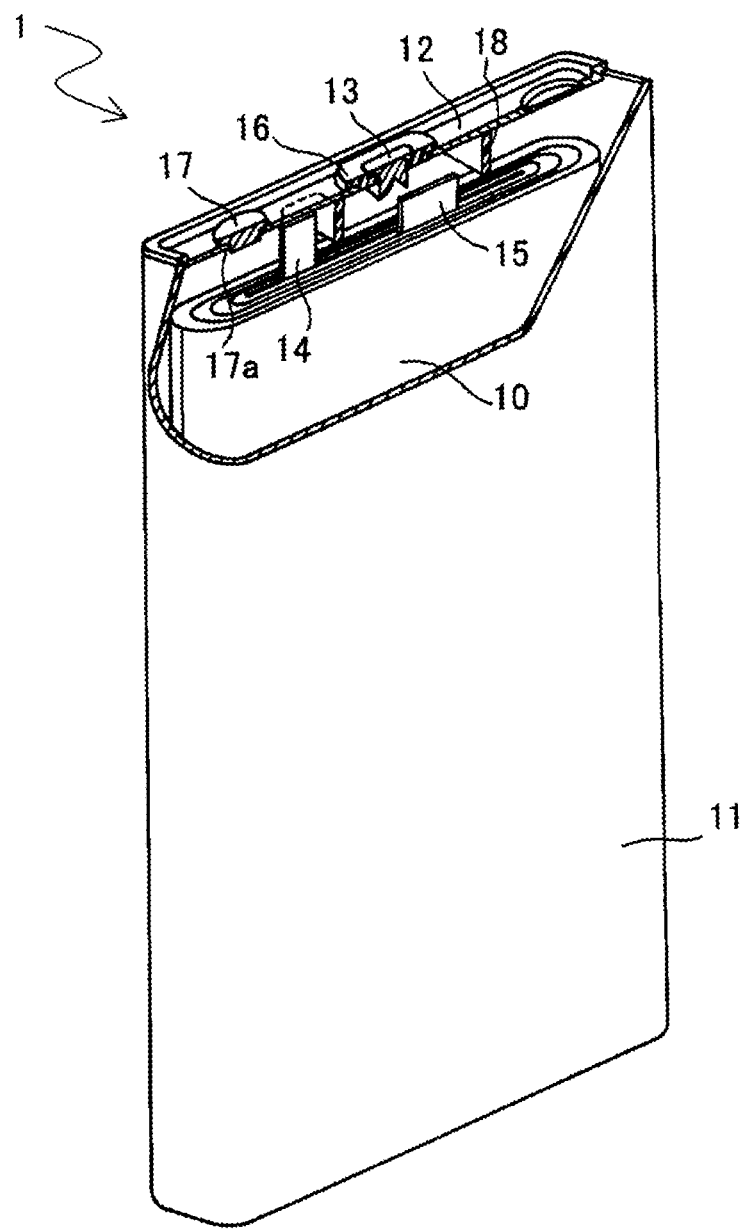

NON-AQUEOUS ELECTROLYTE SECONDARY BATTERY

TECHNICAL FIELD

The present disclosure primarily relates to improvement of a liquid electrolyte of a non-aqueous electrolyte secondary battery.

BACKGROUND ART

Non-aqueous electrolyte secondary batteries, especially lithium-ion secondary batteries, are expected as a power source for small consumer applications, power storage devices and electric vehicles because of their high voltage and high energy density.

PTL 1 proposes a lithium ion secondary battery including at least one first lithium salt selected from $LiP_6$, $LiBF_4$, $LiN(SO_2F)_2$, $LiN(SO_2CF_3)_2$ and $LiN(SO_2C_2F_6)_2$ and at least one second lithium salt selected from a lithium salt having an oxalic acid skeleton, a lithium salt having a phosphoric acid skeleton, and a lithium salt having an S=O group in the non-aqueous electrolyte. In PTL 1, by using four or more of the first lithium salt and the second lithium salt in total, it is assumed that discharge capacity retention ratio at a high temperature (60° C.) is improved.

In addition, in PTL 2, cycle characteristics at a high temperature (45° C.) is improved in a non-aqueous electrolyte battery that contains a liquid electrolyte including a compound having a fluorosulfonyl structure ($-SO_2F$) and at least one compound selected from the group consisting of difluorophosphoric acid salts and isocyanate compounds, and contains a negative electrode including a negative electrode active material containing metal particles alloyable with Li and graphite particles.

CITATION LIST

Patent Literature

[PTL 1] WO 2016/009994
[PTL 2] WO 2014/157591

SUMMARY OF INVENTION

According to PTLs 1 and 2 described above, it is shown that adding the compound described in the above document into a liquid electrolyte can improve cycle characteristics at high temperatures. However, it does not lead to improve cycle characteristics at low temperatures, leaving problems in improving both cycle characteristics at high temperatures and cycle characteristics at low temperatures.

In view of the above, one aspect of the present disclosure relates to a non-aqueous electrolyte secondary battery including a positive electrode, a separator, a negative electrode opposed to the positive electrode via the separator, and a liquid electrolyte, wherein the liquid electrolyte includes a lithium salt, methyl acetate, and dimethyl sulfone, wherein a content ratio of the methyl acetate in the liquid electrolyte is 10% by mass to 40% by mass, and a content ratio of the dimethyl sulfone in the liquid electrolyte is 0.1% by mass to 5% by mass.

According to the present disclosure, it is possible to realize a non-aqueous electrolyte secondary battery excellent in both cycle characteristics at high temperatures and cycle characteristics at low temperatures.

BRIEF DESCRIPTION OF DRAWING

FIG. 1 shows a schematic partially cut-away oblique view of the non-aqueous electrolyte secondary battery according to an embodiment of the present disclosure.

DESCRIPTION OF EMBODIMENTS

The non-aqueous electrolyte secondary battery according to an embodiment of the present disclosure has a positive electrode, a separator, a negative electrode opposed to the positive electrode via the separator, and a liquid electrolyte. The liquid electrolyte contains a lithium salt, methyl acetate and dimethyl sulfone as essential components. The content of methyl acetate in the liquid electrolyte is 10% by mass to 40% by mass. The content ratio of dimethyl sulfone in the liquid electrolyte is 0.1% by mass to 5% by mass.

It is considered that dimethyl sulfone has an action of forming a good quality film on the surface of the negative electrode active material alone or together with other liquid electrolyte components and suppressing excessive side reactions of the liquid electrolyte component. Thus, dimethyl sulfone contributes to the improvement of the cycle characteristics of the battery at high temperatures and low temperatures.

Since methyl acetate contained in the solvent of the liquid electrolyte has a low viscosity, it has an action of suppressing an increase in viscosity of the liquid electrolyte under a low temperature. Thus, the occurrence of unevenness in the lithium salt concentration is suppressed in the liquid electrolyte, and the charge and discharge are suppressed from becoming uneven, thereby improving the low-temperature characteristics. A high level of capacity retention ratio is obtained even in a low temperature environment of, for example, 25° C.

On the other hand, methyl acetate is easily decomposed under high temperatures. Therefore, in a high-temperature environment, the internal resistance may increase due to side reactions caused by decomposition of methyl acetate. However, when the liquid electrolyte contains dimethyl sulfone, side reactions caused by decomposition of methyl acetate are also suppressed. Thus, a high level of capacity retention ratio is obtained even in a high temperature environment of, for example, 45° C.

Therefore, according to the non-aqueous electrolyte secondary battery of an embodiment of the present disclosure, since the liquid electrolyte contains dimethyl sulfone and methyl acetate, excellent cycle characteristics can be realized at both high temperatures and low temperatures.

By setting the content of methyl acetate in the liquid electrolyte to 10% by mass or more, the viscosity of the liquid electrolyte can be maintained low, and high cycle characteristics can be obtained even under low temperatures. On the other hand, by setting the content of methyl acetate in the liquid electrolyte to 40% by mass or less, decomposition of methyl acetate is suppressed by dimethyl sulfone, and an increase in internal resistance can be suppressed in a high-temperature environment. When dimethyl sulfone is contained in the liquid electrolyte in an amount of 0.1% by mass or more, decomposition of methyl acetate can be suppressed. The dimethyl sulfone may be contained in the liquid electrolyte at a content of 5% by mass or less, and may be contained at a content of 3% by mass or less. The content ratio of methyl acetate may be 10% by mass to 30% by mass with respect to the liquid electrolyte, and may be 10% by mass to 20% by mass.

The positive electrode may include, for example, a positive electrode material containing a lithium-containing composite oxide. The lithium-containing composite oxide may be a compound having a layered rock salt type crystal structure containing lithium and a transition metal. The lithium-containing composite oxide may be a lithium nickel composite oxide containing at least nickel as the transition metal of the above-mentioned layered compound. In the lithium nickel composite oxide, an atomic fraction of the nickel in the metal elements other than lithium may be 0.9 or more.

Specifically, the lithium nickel composite oxide may contain a material represented by the compositional formula $Li_aNi_xM_{1-x}O_2$ where M is at least one selected from the group consisting of Na, Mg, Sc, Y, Mn, Fe, Co, Cu, Zn, Al, Cr, Pb, Sb and B, $0<a\leq1.2$, and $0.8\leq x\leq1$. Note that the value "a" indicating the molar ratio of lithium is increased or decreased by charging and discharging. In terms of obtaining high capacity, the nickel ratio x of the lithium nickel composite oxide may be 0.9 or more.

However, as the nickel ratio x of the lithium nickel composite oxide becomes larger, the alkalinity becomes stronger, and the decomposition reaction of methyl acetate tends to proceed in a high temperature environment. Further, as the nickel ratio x becomes larger, the stability of the crystal structure of the lithium nickel composite oxide decreases, and three valent nickel tends to be reduced. As a result, the lithium nickel composite oxide tends to be changed (inactivated) into a structure in which reversible release and storage of lithium ions are difficult due to reduction of nickel.

When the liquid electrolyte contains methyl acetate, it is likely that methyl acetate is reduced on the side of the negative electrode, and the reduction reaction product further moves toward the side of the positive electrode and undergoes an oxidation reaction. At this time, nickel of the lithium nickel composite oxide can be reduced accompanying the oxidation reaction. Due to the reduction of nickel, the surface layer of the lithium nickel composite oxide can be inactivated. In this respect, a decrease in the capacity retention ratio at a high temperature in a case of using a liquid electrolyte containing methyl acetate is remarkable when the nickel ratio x of the lithium nickel composite oxide is high.

However, in a battery of the present embodiment, since a coating film derived from dimethyl sulfone is formed on the surface of the negative electrode active material, reduction decomposition of methyl acetate at the negative electrode is suppressed. As a result, the oxidation reaction of the reduction reaction product at the positive electrode and the inactivation of the surface layer of the positive electrode active material are also suppressed, and an increase in the positive electrode resistance can be suppressed. Therefore, a lithium nickel composite oxide having a nickel ratio x of 0.9 or more can be used for a positive electrode, and a decrease in capacity in a high temperature environment is suppressed and a high capacity is maintained.

Next, detailed explanation of the non-aqueous electrolyte secondary battery according to an embodiment of the present disclosure is described. The non-aqueous electrolyte secondary battery includes, for example, a liquid electrolyte, a negative electrode, and a positive electrode as follows.

[Liquid Electrolyte]

The liquid electrolyte usually contains a non-aqueous solvent and a solute dissolved in the non-aqueous solvent. The non-aqueous solvent contains methyl acetate as an essential component. The solute contains a lithium salt as an essential component. The solute is an electrolytic salt which ionically dissociates in the liquid electrolyte. Components of the liquid electrolyte other than the solvent and the solute are additives. Various additives may be included in the liquid electrolyte. In this embodiment, the additive contains dimethyl sulfone as an essential component. Further, carboxylic acids and alcohols to be described later are classified into additives. Note that a polymer which alone exhibits a solid state at 25° C. is not included in the liquid electrolyte component even when the content thereof in the liquid electrolyte is 3% by mass or more. Such a polymer functions as a matrix for gelling the liquid electrolyte.

As the non-aqueous solvent, for example, a cyclic carbonic acid ester, a chain carbonic acid ester, a cyclic carboxylic acid ester, and the like are used in addition to methyl acetate. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). The non-aqueous solvent may be used singly, or two or more kinds thereof may be used in combination.

As the lithium salt, for example, the following can be used: a lithium salt of a chlorine-containing acid ($LiClO_4$, $LiAlCl_4$, $LiB_{10}Cl_{10}$, etc.); a lithium salt of fluorine-containing acid ($LiPF_6$, $LiBF_4$, $LiSbF_6$, $LiAsF_6$, $LiCF_3SO_3$, $LiCF_3CO_2$, etc.); a lithium salt of fluorine containing imides ($LiN(FSO_2)_2$, $LiN(CF_3SO_2)_2$, $LiN(CF_3SO_2)(C_4F_9SO_2)$. $LiN(C_2F_5SO_2)_2$, etc.); and a lithium halide (LiCl, LiBr, LiI, etc.); and so on. The lithium salt may be used singly, or two or more kinds thereof may be used in combination.

The lithium salt may include lithium difluorophosphate ($LiPF_2O_2$). It is considered that lithium difluorophosphate has an action of forming a good quality film on the surface of the positive electrode active material alone or together with other liquid electrolyte components and suppressing excessive side reactions of the liquid electrolyte components. The lithium difluorophosphate may be present in the non-aqueous liquid electrolyte as a difluorophosphate anion ($PF_2O_2^-$). Further, the difluorophosphate anion may be present in the non-aqueous liquid electrolyte in a state of difluorophosphoric acid ($HPF_2O_2$) bonded to hydrogen. In other words, the total amount of lithium difluorophosphate, difluorophosphoric acid and difluorophosphate anion is determined as the content of lithium difluorophosphate in the non-aqueous liquid electrolyte. Hereinafter, lithium difluorophosphate, difluorophosphoric acid and difluorophosphate anion will be collectively referred to as a difluorophosphate group.

The content of lithium difluorophosphate contained in the liquid electrolyte may be, for example, 0.1% by mass or more, and may be 0.5% by mass or more, with respect to the mass of the liquid electrolyte, from the viewpoint of sufficiently improving the storage characteristics of the battery. In addition, from the viewpoint of suppressing the formation of an inert film on the surface of the positive electrode active material as less as possible, the content of lithium difluorophosphate may be, for example, 1% by mass or less, and may be 1.5% by mass or less, with respect to the mass of the non-aqueous liquid electrolyte.

Note that the content of lithium difluorophosphate contained in the liquid electrolyte may be determined as the total amount of the undissociated difluorophosphoric acid or lithium difluorophosphate and the difluorophosphate anion, and the total amount may be calculated in terms of the mass of lithium difluorophosphate to determine the content. In other words, the content of the difluorophosphate group may be determined by assuming that all of the difluorophosphate group is lithium difluorophosphate. For example, when the non-aqueous electrolyte contains lithium difluorophosphate and all of the lithium difluorophosphate dissociate and are present in the form of difluorophosphate anions, it is assumed that all of the difluorophosphate anions are present in the form of lithium difluorophosphate ($LiPO_2F_2$). Then, the amount of lithium difluorophosphate contained in the non-aqueous liquid electrolyte is determined on the basis of the formula weight (107.91) of lithium difluorophosphate.

The lithium salt may also include lithium bis(fluorosulfonyl)imide ($LiN(FSO_2)_2$) (hereinafter, also referred to as LFSI)). LFSI forms a film (hereinafter, also referred to as a LFSI film) on the surface of the positive electrode and the negative electrode, which is excellent in lithium-ion conductivity and suppresses decomposition of the liquid electrolyte. LFSI film prevents the reduction in capacity retention ratios in an early stage of charge and discharge cycles.

An alcohol may be added to the liquid electrolyte. It is presumed that the alcohol is adsorbed on the surface of the composite oxide which is a positive electrode active material and functions as a protective layer for suppressing the decomposition reaction of the liquid electrolyte. Further, a carboxylic acid may be added to the liquid electrolyte. It is considered that the carboxylic acid neutralizes alkali component derived from the positive electrode active material and adsorbs on the surface of the positive electrode active material to suppress the inactivation of the surface layer of the positive electrode active material due to the side reaction of the liquid electrolyte as in the case of alcohols.

The alcohol is preferably an aliphatic alcohol, and may be a monoalcohol, a dialcohol, or a polyol with more hydroxy groups. Among them, at least one monoalcohol having 1 to 4 carbon atoms is preferably used, and methanol is most preferably used.

The type of the carboxylic acid is not particularly limited, and a carboxylic anhydride is also deemed as a carboxylic acid. The carboxylic acid may be a monocarboxylic acid or a dicarboxylic acid, but when a dicarboxylic acid is used, a carboxylic anhydride is preferably used. Among them, at least one selected from the group consisting of monocarboxylic acids having 2 to 4 carbon atoms are preferably used, and acetic acid is most preferably used. The proportion of acetic acid in the carboxylic acid is preferably 50% by mass or more, more preferably 80% by mass or more, and may be 100%.

The carboxylic acid may be present in the liquid electrolyte as a Bronsted acid in which hydrogen is not dissociated, for example, in a state of R—COOH (R is an organic functional group), and may be present as a carboxylic acid anion (R—COO") in which hydrogen is dissociated. Further, the carboxylic acid anion may be an anion derived from a carboxylic acid salt (e.g., R—COOLi). When calculating the content of the carboxylic acid, the compounds present in the form of an anion and a salt are also considered as the carboxylic acid. In other words, the total amount of the carboxylic acid and the carboxylic acid anion is determined as the content of the carboxylic acid in the non-aqueous liquid electrolyte. Hereinafter, a carboxylic acid, a carboxylic acid salt, and a carboxylic acid anion will be collectively referred to as a carboxylic acid group.

In addition, alcohols and/or carboxylic acids may have an effect of suppressing the hydrolysis (or saponification) reaction of methyl acetate in an alkaline environment. Since the alcohol and/or the carboxylic acid is contained in the liquid electrolyte together with methyl acetate, the equilibrium of the above reaction is transferred to the generation side of methyl acetate, and the decomposition of methyl acetate can be suppressed. In this regard, the alcohol is preferably methanol, and the carboxylic acid group is preferably at least one of acetic acid, an acetic acid salt, and acetate anion.

The content of alcohol in the liquid electrolyte contained in the battery is preferably 5 ppm or more and 500 ppm or less, more preferably 5 ppm or more and 100 ppm or less, with respect to the mass of the liquid electrolyte. In the liquid electrolyte before injection into the battery, the content of alcohol is preferably 10 ppm or more and 500 ppm or less, more preferably 10 ppm or more and 100 ppm or less, with respect to the mass of the liquid electrolyte. At least a portion of the alcohol in the liquid electrolyte injected into the battery is adsorbed on the surface of the positive electrode active material.

The content of the carboxylic acid in the liquid electrolyte contained in the battery is preferably 5 ppm or more and 500 ppm or less, more preferably 5 ppm or more and 100 ppm or less, with respect to the mass of the liquid electrolyte. In the liquid electrolyte before injection into the battery, the content of the carboxylic acid is preferably 10 ppm or more and 500 ppm or less, more preferably 10 ppm or more and 100 ppm or less, with respect to the mass of the liquid electrolyte. At least a portion of the carboxylic acid in the liquid electrolyte injected into the battery is oxidized or reduced when the battery is charged and discharged, and can be used for film formation.

In addition, when the lithium salt contains lithium difluorophosphate and the liquid electrolyte contains a carboxylic acid, the carboxylic acid promotes the formation of a good quality film on the positive electrode in which lithium difluorophosphate or an anion thereof is involved, and the inactivation of the surface layer of the positive electrode active material due to the side reaction of the liquid electrolyte can be further suppressed. Thus, in the long term, the amount of inert film generated on the surface of the positive electrode active material can be further reduced.

In addition, when the lithium salt contains LFSI, by allowing a carboxylic acid to be included in the liquid electrolyte, the carboxylic acid has an action of suppressing an excessive reaction of LFSI on the surface of the positive electrode. Thus, inactivation of LFSI film and increase in resistance due to excessive reaction of LFSI are suppressed, and even after repeated charge and discharge cycles for a long period of time, a decrease in capacity can be suppressed. In particular, when the positive electrode contains a lithium nickel composite oxide and its nickel ratio x is large (e.g., x≥0.9), an effect of suppressing an excessive reaction of LFSI becomes remarkable. It is presumed that an alkali component is neutralized by the carboxylic acid to suppress an excessive reaction between LFSI and the alkali component.

Lithium difluorophosphate, LFSI and/or carboxylic acids can be partially consumed to form a film, respectively, through pre-charging and discharging or initial charging and discharging prior to shipping. Therefore, when the non-aqueous liquid electrolyte is prepared or manufactured, in consideration of the amount of components consumed in the film formation, the formulation is determined so that a sufficient amount as described above remains in the battery after shipping.

The contents of the carboxylic acid and the alcohol in the liquid electrolyte can be measured, for example, by using gas chromatography-mass spectrometry (GC-MS) or the like. Further, the contents of the lithium salt and the difluorophosphoric acid group can be measured, for example, by using NMR, ion chromatography, or the like.

The concentration of the lithium salt in the liquid electrolyte is preferably 1 mol/liter or more and 2 mol/liter or less, and more preferably 1 mol/liter or more and 1.5 mol/liter or less. By controlling the lithium salt concentration within the above range, a liquid electrolyte having excellent ion-conductivity and moderate viscosity can be obtained. However, the lithium salt concentration is not limited to the above.

The liquid electrolyte may contain other known additives. Examples of the additive include 1,3-propanesultone, methylbenzenesulfonate, cyclohexylbenzene, biphenyl, diphenyl ether, and fluorobenzene.

[Negative Electrode]

The negative electrode includes, for example, a negative electrode current collector and a negative electrode mixture layer formed on the surface of the negative electrode current collector and containing the negative electrode active material. The negative electrode mixture layer can be formed, for example, by coating a negative electrode slurry in which a negative electrode mixture containing a negative electrode active material, a binder, and the like are dispersed in a dispersion medium on a surface of a negative electrode current collector and drying the slurry. The dry applied film may be rolled, if necessary. The negative electrode mixture layer may be formed on one surface of the negative electrode current collector, or on both surfaces thereof.

The negative electrode mixture contains a negative electrode active material as an essential component, and may contain optional components, such as a binder, an electrically conductive agent, and a thickener. As the binder, the conductive agent, and the thickener, known materials can be used.

The negative electrode active material includes a material which electrochemically absorbs and releases lithium ions. As the material for absorbing and releasing lithium ions electrochemically, a carbon material, an alloy-based material, or the like is used. Examples of the carbon material include graphite, easily graphitizable carbon (soft carbon), and non-graphitizable carbon (hard carbon). Preferred among them is graphite, which is excellent in stability during charging and discharging and has small irreversible capacity. Examples of the alloy-based material include silicon, tin, a silicon alloy, a tin alloy, and a silicon compound. Among them, a composite material composed of a silicate phase and silicon particles dispersed in the silicate phase is preferred in terms of high capacity and low irreversible capacity.

Examples of the negative electrode current collector include a non-porous electrically conductive base material (e.g. metal foil), and a porous electrically conductive base material(e.g., mesh, net, punched sheet). The negative electrode current collector may be made of, for example, stainless steel, nickel, a nickel alloy, copper, and a copper alloy.

[Positive Electrode]

The positive electrode includes, for example, a positive electrode current collector and a positive electrode mixture layer formed on the surface of the positive electrode current collector and containing a positive electrode active material. The positive electrode mixture layer can be formed, for example, by coating a positive electrode slurry in which a positive electrode mixture containing a positive electrode active material, a binder, and the like are dispersed in a dispersion medium on a surface of a positive electrode current collector and drying the slurry. The dry applied film may be rolled, if necessary. The positive electrode mixture layer may be formed on one surface of the positive electrode current collector, and may be formed on both surfaces thereof.

As the positive electrode active material, a layered compound having a rock salt type crystal structure containing lithium and a transition metal may be used. Examples of the layered compound include $Li_aCoO_2$, $Li_aNiO_2$, $Li_aMnO_2$, $Li_aCo_bNi_{1-b}O_2$, $Li_aCo_{1-b}M_bO_c$, $Li_aNi_{1-b}M_bO_c$, and the like. A spinel compound containing lithium and a transition metal may be used. Examples of the spinel compound include $Li_aMn_2O_4$, $Li_aMn_{2-b}M_bO_4$, and the like. Alternatively, a polyanionic compound such as $LiMPO_4$. $Li_2MPO_4F$ may be used. Here, M is at least one selected from the group consisting of Na, Mg, Sc, Y, Mn, Fe, Co, Ni, Cu, Zn, Al, Cr, Pb, Sb and B, a=0 to 1.2, b=0 to 0.9, and c=2.0 to 2.3. Note that the numerical value of a is increased or decreased by charging and discharging.

Among the above-mentioned lithium-containing composite oxides, it is also possible to use a lithium nickel composite oxide represented by $Li_aNi_bM_{1-b}O_2$. In the above lithium nickel composite oxide. M may be at least one selected from the group consisting of Mn, Co and Al. From the viewpoint of increasing the capacity, 0.8≤b≤1 may be satisfied. From the viewpoint of increasing the capacity, b≥0.9 is more preferable. However, as the Ni ratio b increases, the alkalinity tends to be stronger.

From the viewpoint of the stability of the crystal structure, $Li_aNi_bCo_{bx}Al_{by}O_2$ (a=0 to 1.2, b=0.8 to 1, bx=0 to 0.15, by=0 to 0.1, b+bx+by=1) containing Co and Al as M may be used.

Specific examples of such a lithium nickel composite oxide include a lithium-nickel-cobalt composite oxide ($LiNi_{0.8}Co_{0.2}O_2$ and the like), and a lithium-nickel-cobalt-aluminum composite oxide ($LiNi_{0.8}Co_{0.15}Al_{0.05}O_2$, $LiNi_{0.8}Co_{0.18}Al_{0.02}O_2$, $LiNi_{0.9}Co_{0.05}Al_{0.05}O_2$ and the like).

The shape and thickness of the positive electrode current collector can be selected from the shapes and ranges according to the negative electrode current collector, respectively. The positive electrode current collector may be made of, for example, stainless steel, aluminum, an aluminum alloy, and titanium.

[Separator]

Usually, it is desirable to interpose a separator between the positive electrode and the negative electrode. The separator is excellent in ion permeability and has moderate mechanical strength and electrically insulating property. The separator may be, for example, a microporous thin film, a woven fabric, or a nonwoven fabric. The separator is preferably made of, for example, polyolefin, such as polypropylene or polyethylene.

Examples of the structure of the non-aqueous electrolyte secondary battery include those in which an electrode group including the positive and negative electrodes wound with a separator interposed therebetween, and a non-aqueous electrolyte are housed in an external material. The wound-type electrode group may be replaced with a different form of the electrode group, for example, a stacked-type electrode group formed by stacking the positive and negative electrodes with the separator interposed therebetween. The non-aqueous electrolyte secondary battery may be in any form, such as cylindrical, rectangular, coin, button, laminated, etc.

FIG. 1 is a schematic partially cut-away oblique view of a rectangular non-aqueous electrolyte secondary battery according to one embodiment of the disclosure.

The battery includes a bottomed square battery case 11, an electrode group 10, and a non-aqueous electrolyte (not shown) housed in the battery case 11. The electrode group 10 has a long strip-like negative electrode and a long strip-like positive electrode and a separator interposed and preventing direct contact therebetween. The electrode group 10 is formed by winding the negative electrode, the positive electrode and the separator around a flat winding core and removing the winding core.

One end of a negative electrode lead 15 is attached to the negative electrode current collector of the negative electrode by welding or the like. One end of a positive electrode lead 14 is attached to the positive electrode current collector of the positive electrode by welding or the like. The other end of the negative electrode lead 15 is electrically connected to the negative terminal 13 provided on a sealing plate 12. A gasket 16 is disposed between the sealing plate 12 and the negative electrode terminal 13, to provide electrical insulation therebetween. The other end of the positive lead 14 is electrically connected to the sealing plate 12 and connected to the battery case 11 also serving as a positive terminal. On the upper portion of the electrode group 10, a frame body 18 made of resin for separating the electrode group 10 and the sealing plate 12 and separating the negative electrode lead 15 and the battery case 11 is disposed. Then, the opening of the battery case 11 is sealed with the sealing plate 12. A liquid injection port 17a is formed in the sealing plate 12, and the electrolyte is poured into the square battery case 11 from the liquid injection port 17a. Thereafter, the liquid injection port 17a is closed with a sealing plug 17.

The structure of the non-aqueous electrolyte secondary battery may be cylindrical, coin-shaped, button-shaped or the like, provided with a metal battery case, and may be a laminate type having a laminate sheet battery case made of a laminated body of a barrier layer and a resin sheet. In the present disclosure, the type, shape, and the like of the secondary battery are not particularly limited.

Hereinafter, the present disclosure will be specifically described based on Examples and Comparative Examples, but the present disclosure is not limited to the following Examples.

Example 1

[Preparation of Negative Electrode].

Graphite as a negative electrode active material, sodium carboxy methylcellulose (CMC-Na), styrene-butadiene rubber (SBR), and water were mixed at a predetermined mass ratio to prepare a negative electrode slurry. Next, a negative electrode slurry was applied to each surface of a copper foil as a negative electrode current collector, and the coating film was dried, and then rolled to form a negative electrode mixture layer on both surfaces of the copper foil.

[Preparation of Positive Electrode].

Lithium nickel composite oxide ($LiNi_{0.91}Co_{0.06}Al_{0.3}O_2$) as a positive electrode active material, acetylene black, polyvinylidene fluoride, and N-methyl-2-pyrrolidone (NMP) were mixed at a predetermined mass ratio to prepare a positive electrode slurry. Next, a positive electrode slurry was applied to each surface of an aluminum foil as a positive electrode current collector, and the coating film was dried, and then rolled to form a positive electrode mixture layer on both surfaces of the aluminum foil.

[Preparation of Non-Aqueous Liquid Electrolyte].

To a mixed solvent containing ethylene carbonate (EC), ethyl methyl carbonate (EMC), dimethyl carbonate (DMC) and methyl acetate (MA) in a volume ratio of 20:5:55:20, $LiPF_6$, lithium difluorophosphate (DFP) and dimethyl sulfone (DMS) were added to prepare a non-aqueous liquid electrolyte. The concentration of $LiPF_6$ in the non-aqueous liquid electrolyte was set to 1.35 mol/L. The amounts of DFP and DMS added were set to 1% by mass with respect to the whole non-aqueous liquid electrolyte, respectively. The purity of methyl acetate was 99.9999%. The concentration of methyl acetate in the liquid electrolyte after preparation was 13% by mass with respect to the whole non-aqueous liquid electrolyte.

[Fabrication of Non-Aqueous Electrolyte Secondary Battery].

A lead tab was attached to each electrode respectively, and an electrode group was produced by winding the positive electrode and the negative electrode in a spiral shape via a separator so that the leads were positioned at the outermost peripheral portion. The electrode group was inserted into an exterior body made of a laminate film using an aluminum foil as a barrier layer, dried under vacuum at 105° C. for 2 hours, and then the non-aqueous liquid electrolyte was injected thereinto and an opening of the exterior body was sealed to obtain a battery A1.

Examples 2

A portion of $LiPF_6$ used in Example 1 was replaced with LFSI to prepare a non-aqueous liquid electrolyte. Specifically, the concentration of $LiPF_6$ in the non-aqueous liquid electrolyte was set to 1.15 mol/L, and the concentration of LFSI was set to 0.2 mol/L. Except for the above, a non-aqueous electrolyte secondary battery was manufactured in the same manner as in Example 1 to obtain a battery A2.

Comparative Example 1

In preparing the non-aqueous electrolyte, $LiPF_6$ was added to a mixed solvent containing ethylene carbonate (EC), ethyl methyl carbonate (EMC) and dimethyl carbonate (DMC) in a volume ratio of 20:5:75 to prepare a non-aqueous liquid electrolyte. The concentration of $LiPF_6$ in the non-aqueous liquid electrolyte was set to 1.35 mol/L, and DFP and DMS were not added. Except for the above, a non-aqueous electrolyte secondary battery was manufactured in the same manner as in Example 1 to obtain a battery B1.

Comparative Example 2

DMS was added to the mixed solvent of Comparative Example 1 to prepare a non-aqueous liquid electrolyte. The amount of DMS added was set to 1% by mass with respect to the whole non-aqueous liquid electrolyte. Except for the above, a non-aqueous electrolyte secondary battery was manufactured in the same manner as in Comparative Example 1 to obtain a battery B2.

Comparative Example 3

Except that DMS was not added to the mixed solvent, a non-aqueous liquid electrolyte was prepared as in Example 1. The amount of DFP added was set to 1% by mass with respect to the whole non-aqueous liquid electrolyte. Except for the above, a non-aqueous electrolyte secondary battery was manufactured in the same manner as in Example 1 to obtain a battery B3.

Comparative Example 4

Except that DMS was not added to the mixed solvent, a non-aqueous liquid electrolyte was prepared as in Example 2. The amount of DFP added was set to 1% by mass with respect to the whole non-aqueous liquid electrolyte. Except for the above, a non-aqueous electrolyte secondary battery was manufactured in the same manner as in Example 2 to obtain a battery B4.

Comparative Example 5

Except that ethyl methyl sulfone (EMS) was added instead of DMS in a mixed solvent, a non-aqueous liquid electrolyte was prepared as in Example 1. The amount of EMC added was set to 1% by mass with respect to the whole non-aqueous liquid electrolyte. Except for the above, a non-aqueous electrolyte secondary battery was manufactured in the same manner as in Example 1 to obtain a battery B5.

[Evaluation]
(Initial Charge/Discharge)

Each battery after completion was placed in an ambient of 25° C., and constant current charge was conducted until the voltage became 4.1 V at a current of 0.3 It, then constant voltage charge was conducted until the current became 0.02 It at a constant voltage of 4.1 V. Thereafter, a constant current discharge was performed until the voltage became 2.85 V at a current of 0.3 It, and the initial discharge capacity Co was determined. The charge and discharge were carried out under an environment of 25° C.

(Low Temperature Cycle Retention Ratio)

The pause period between the charge and discharge was set to 10 minutes, and in an environment of 25° C., the charge and discharge were repeated 300 cycles at the above charge and discharge conditions, and the discharge capacity $C_1$ at the 300th cycle was determined. The ratio $X_1=C_1/C_0$ of the capacity $C_1$ to the initial capacity $C_0$ was evaluated as the capacity retention ratio at a low temperature.

(High Temperature Cycle Retention Ratio)

The battery after the initial charge and discharge was placed in an environment of 45° C., and the charge and discharge were repeated 300 cycles under the above charge and discharge conditions, and the discharge capacity $C_2$ at the 300th cycle was determined. The ratio $X_2=C_2/C_0$ of the capacity $C_2$ to the initial capacity $C_0$ was evaluated as the capacity retention ratio at a high temperature.

Table 1 shows the evaluation results of the capacity retention ratio at low and high temperatures of the batteries A1, A2, and B1 to B5. From Table 1, batteries A1 and A2 are improved in both the low temperature capacity retention ratio $X_1$ and the high temperature capacity retention ratio $X_2$ compared to batteries B1 to B5.

The group consisting of batteries B1 and B2 and the group consisting of batteries B3 and B4 are compared below. In the batteries B3 and B4, by adding methyl acetate to the liquid electrolyte, the low-temperature capacity retention ratio $X_1$ was improved over the batteries B1 and B2. However, the high-temperature capacity retention ratio $X_2$ was lower than that of batteries B1 and B2. This is considered to be due to the fact that the decomposition reaction of methyl acetate proceeded under the high temperature.

On the other hand, in the batteries A1 and A2, despite the fact that methyl acetate was added to the liquid electrolyte, the decrease in the high-temperature capacity retention ratio $X_2$ was suppressed by the action of dimethyl sulfone, indicating a high-temperature capacity retention ratio $X_2$ excellent compared to that of the batteries B1 and B2. In addition, a high level of low temperature capacity retention ratio $X_1$ was obtained due to the effect of methyl acetate. On the other hand, ethyl methyl sulfone added in the battery B5 does not exhibit an inhibiting action of lowering the high-temperature capacity retention ratio $X_2$.

When comparing the batteries B1 and B2, when methyl acetate was not added to the liquid electrolyte, the amount of increase in the high-temperature capacity retention ratio $X_2$ due to the addition of dimethyl sulfone was at most about 0.2%. On the other hand, when comparing the batteries B3 and A1, when methyl acetate was added to the liquid electrolyte, the amount of increase in the high-temperature capacity retention ratio $X_2$ due to the addition of dimethyl sulfone was about 0.9%, indicating a remarkable improvement effect.

TABLE 1

| Batteries | Low temperature capacity retention ratio $X_1$ (%) | High temperature capacity retention ratio $X_2$ (%) |
| --- | --- | --- |
| A1 | 93.5 | 89.6 |
| A2 | 93.6 | 89.3 |
| B1 | 92.0 | 89.0 |
| B2 | 91.8 | 89.7 |
| B3 | 93.1 | 88.7 |
| B4 | 93.5 | 88.8 |
| B5 | 93.3 | 88.8 |

INDUSTRIAL APPLICABILITY

According to the present disclosure of the non-aqueous electrolyte secondary battery, non-aqueous electrolyte secondary batteries having high capacity and excellent in high-temperature storage characteristics can be provided. The non-aqueous electrolyte secondary batteries of the disclosure are useful for the main power sources of mobile communication devices, mobile electronic devices, etc.

REFERENCE SIGNS LIST

1: Non-aqueous electrolyte secondary battery
10: Electrode group
11: Battery case
12: Sealing plate
13: Negative electrode terminal
14: Positive electrode lead
15: Negative electrode lead
16: Gasket
17: Sealing plug
17a: Liquid injection port
18: Frame body

The invention claimed is:

1. A non-aqueous electrolyte secondary battery comprising a positive electrode, a separator, a negative electrode opposed to the positive electrode via the separator, and a liquid electrolyte,
   wherein the liquid electrolyte consists essentially of: a lithium salt, methyl acetate, dimethyl sulfone, at least one of: ethylene carbonate, ethyl methyl carbonate, and dimethyl carbonate, and optionally, at least one of an alcohol and a carboxylic acid,
   a content ratio of the methyl acetate in the liquid electrolyte is 10% by mass to 40% by mass, and
   a content ratio of the dimethyl sulfone in the liquid electrolyte is 0.1% by mass to 5% by mass.

2. The non-aqueous electrolyte secondary battery according to claim 1, wherein the positive electrode includes a positive electrode material containing a lithium nickel composite oxide, the lithium nickel composite oxide has a layered rock salt type crystal structure containing lithium and a transition metal and contains at least nickel as the transition metal, and in the lithium nickel composite oxide, an atomic fraction of the nickel in metal elements other than lithium is 0.9 or more.

3. The non-aqueous electrolyte secondary battery according to claim 2, wherein the lithium nickel composite oxide includes a material represented by a compositional formula $Li_aNi_xM_{1-x}O_2$ where M is at least one selected from the group consisting of Na, Mg, Sc, Y, Mn, Fe, Co, Cu, Zn, Al, Cr, Pb, Sb and B, $0<a\leq1.2$, and $0.9\leq x\leq1$.

4. The non-aqueous electrolyte secondary battery according to claim 1, wherein the liquid electrolyte contains the alcohol, and a content of the alcohol in the liquid electrolyte is 5 ppm or more and 500 ppm or less with respect to a mass of the liquid electrolyte.

5. The non-aqueous electrolyte secondary battery according to claim 1, wherein the liquid electrolyte contains the carboxylic acid, and a content of the carboxylic acid in the liquid electrolyte is 5 ppm or more and 500 ppm or less with respect to a mass of the liquid electrolyte.

6. The non-aqueous electrolyte secondary battery according to claim 1, wherein the lithium salt includes lithium difluorophosphate.

7. The non-aqueous electrolyte secondary battery according to claim 1, wherein the lithium salt includes lithium bis(fluorosulfonyl) imide.

8. The non-aqueous electrolyte secondary battery according to claim 1, wherein a concentration of the lithium salt in the liquid electrolyte is 1 mol/liter or more and 2 mol/liter or less.

* * * * *